United States Patent [19]

Gersbacher

[11] 4,155,157
[45] May 22, 1979

[54] BRAZE FIXTURE

[75] Inventor: Harry C. Gersbacher, Dayton, Ohio

[73] Assignee: United Aircraft Products, Inc., Dayton, Ohio

[21] Appl. No.: 883,806

[22] Filed: Mar. 6, 1978

[51] Int. Cl.² ............................................. B23K 37/04
[52] U.S. Cl. ................................. 29/726; 228/44.1 R
[58] Field of Search ................. 29/281.1, 281.4, 281.5, 29/726; 228/44.1 R; 269/112

[56] References Cited

U.S. PATENT DOCUMENTS

| 3,644,978 | 2/1972 | Sullivan et al. | 29/726 |
| 3,872,815 | 3/1975 | Kawai et al. | 228/44.1 R |
| 3,893,611 | 7/1975 | Chartet | 228/44.1 R |
| 3,941,293 | 3/1976 | Chartet | 228/44.1 R |
| 3,941,295 | 3/1976 | Medgebow et al. | 228/44.1 R |

Primary Examiner—Lowell A. Larson
Attorney, Agent, or Firm—J. E. Beringer

[57] ABSTRACT

A fixture useful both to receive and position parts assembled for brazing and to hold the assembled parts during the brazing process. Part locators in the fixture position the parts during assembly or loading, and remain attached to the fixture during brazing. The locators are influenced to maintain an engagement with assembled parts but are able to yield in controlled directions under expansion resulting from the heat of brazing. The result is to obviate distortion in the brazed article. Locators have a linked relationship with relatively fixed support members, and are inherently self aligning in a vertical sense for uniform contact with the parts.

9 Claims, 9 Drawing Figures

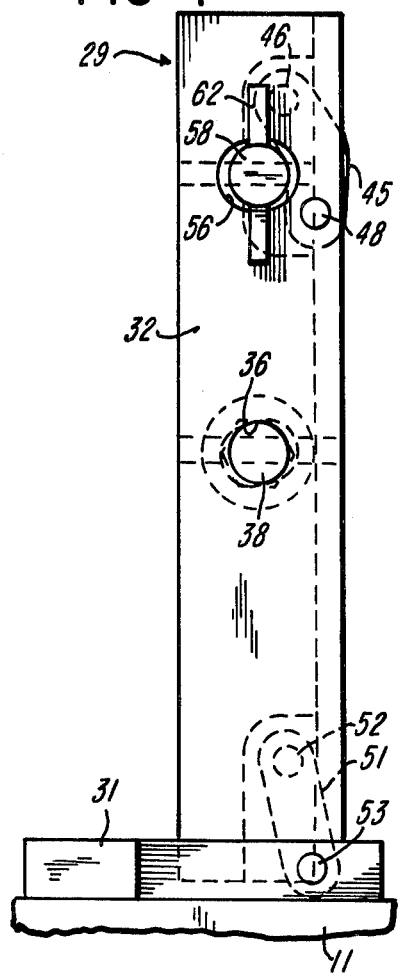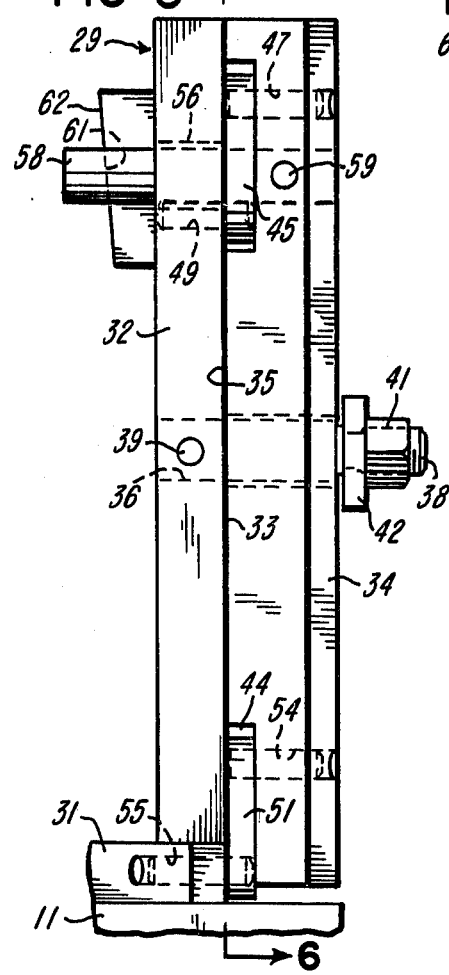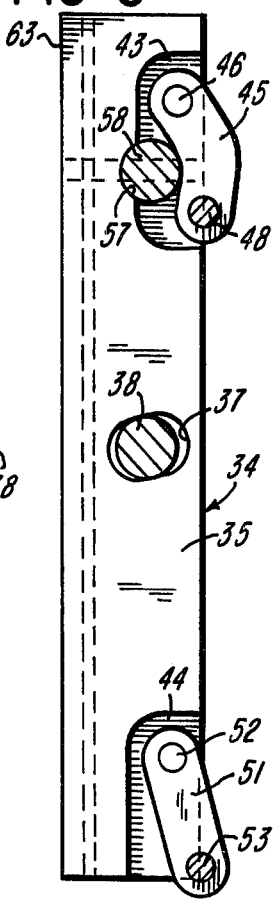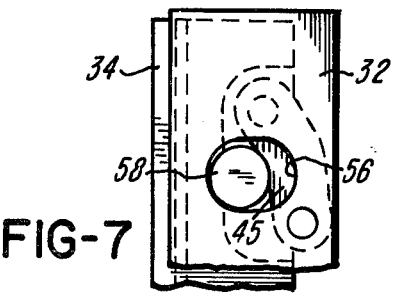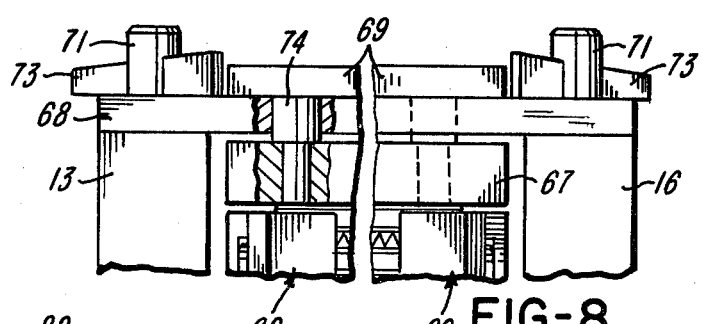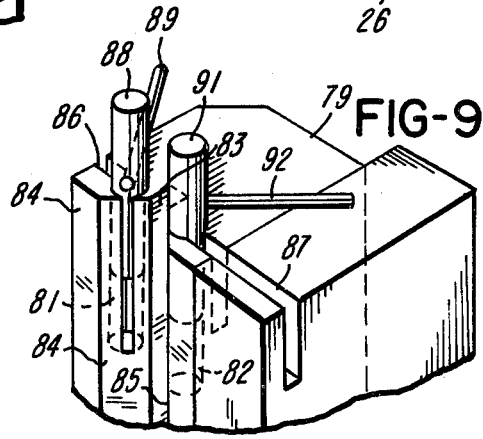

BRAZE FIXTURE

BACKGROUND OF THE INVENTION

1. Field of the Invention

This invention relates to braze fixtures, and especially to fixtures used in the brazing of plate type heat exchangers in which multiple plate and corrugated fin elements, and appropriate spacers, are stacked one upon another, held so that the parts maintain an assembled relation, and brazed to form a unitary heat exchange core or device. In this operation, fixtures play a part both in defining a configuration to receive and position stacked parts and in holding the parts assembled during brazing.

2. Description of the Prior Art

Braze fixtures of the prior art are known which include locators to define a configuration of square-like or other shape corresponding to the peripheral outline of the heat exchangers. Upon an assembled heat exchanger being brazed, however, it has been necessary to effect prior removal of the locators in order to accommodate expansion of the parts as they are heated in the brazing process. Removal of the locators, however, leaves the assembled heat exchanger vulnerable to distortion and to collapse or protrusion of individual components. This is a particular hazard in working with very thin materials and with relatively elongated parts not inherently resistant to distorting pressures. Workers in the art attempt by precise assembly and by carefully controlled techniques to reduce distortion to a tolerable level. Still, rectangular or square heat exchangers which come out of the brazing process out of square or otherwise distorted are not uncommon in heat exchange fabrication. Attempts to cope with this problem using clamps have had limited success since the clamps, if made tight, restrain normal expansion of the parts, and, if made loose, fail in their intended purpose.

My prior application Ser. No. 829,881, filed Sept. 1, 1977, is addressed to a solution of the present problem and discloses an effective braze fixture. The fixture of the instant invention is an improvement over that of my prior application in that it adapts more readily to embodiments requiring a high degree of compactness. Also, in the instant fixture, movement of parts locators is more readily controlled and parallelism more positively assured. In this connection, it will be understood to be increasingly difficult to maintain a close, uniform contact with a corner of a heat exchanger core, as the height thereof increases.

SUMMARY OF THE INVENTION

The present invention is directed to a solution of the above discussed and related problems of the prior art. In the brazing art it provides a fixture having locators properly positioning stacked parts in accordance with the desired heat exchanger configuration. The formed heat exchanger, while remaining in the same fixture and without moving or altering the position of the locators, is subjected to brazing. The locators, according to concepts of the invention, are influenced by gravity to occupy a parts locating position and are mounted for controlled movement with temperature induced expansion and contraction of the formed heat exchanger. An engaged relation of the locators with the assembly of parts is maintained throughout temperature rise and fall and without the imposing of restraints to a free expansion of the parts. A correct, in-line, relationship of the parts is assured, leading to a simple relatively trouble free production of brazed assemblies substantially free of distortion.

A plurality of parts locators is provided, each comprising a relatively stationary support member and a relatively movable locator member. The support member and locator member have a linked relationship allowing a relative movement of the parts locator which is essentially arcuate but which within the limits of permitted motion is substantially in an inclined plane. A base plate and an overlying top plate cooperate in applying vertical compression to an assembled heat exchanger during the brazing process. Supplemental top plate means provides for continuing compression even though the assembly of parts shrinks away from an installed top plate in a cooling portion of the braze cycle.

An object of the invention is to provide a braze fixture substantially in accordance with the foregoing.

Other objects and structural details of the invention will appear from the following description, when read in connection with the accompanying drawings, wherein:

FIG. 4 is a detail view in side elevation of a parts locator assembly comprising a support member and an attached locator member, the parts being shown as positioned for stacking of the core;

FIG. 5 is a front view of the assembly of FIG. 4;

FIG. 6 is a view in cross section, taken substantially along the line 6—6 of FIG. 5;

FIG. 7 is a fragmentary view like FIG. 4, showing the parts in a position in which the locator member is released for a following engagement with a contacted core;

FIG. 8 is a fragmentary view like FIG. 3, showing upper plate portions in positions assumed at the conclusion of the brazing operation; and FIG. 9 is a fragmentary view of a parts locator according to another invention embodiment.

DESCRIPTION OF PREFERRED EMBODIMENT

Figure 1:
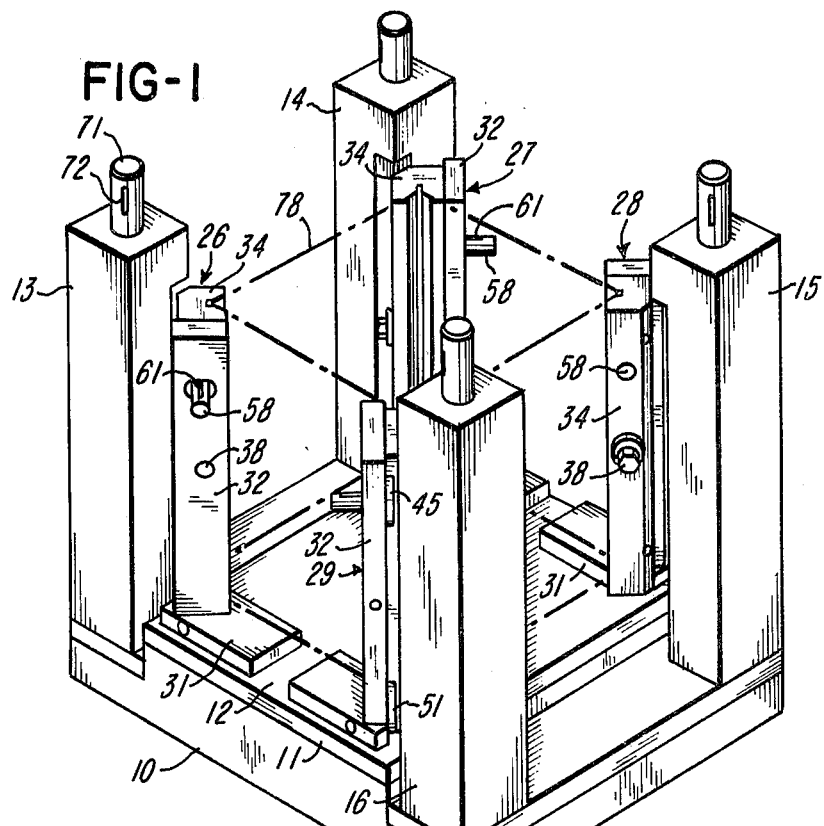
FIG. 1 is a view in perspective of a braze fixture in accordance with the illustrated embodiment of the invention, top plate structure being omitted and the presence of a "dummy" core being indicated in broken lines.
Figure 2:
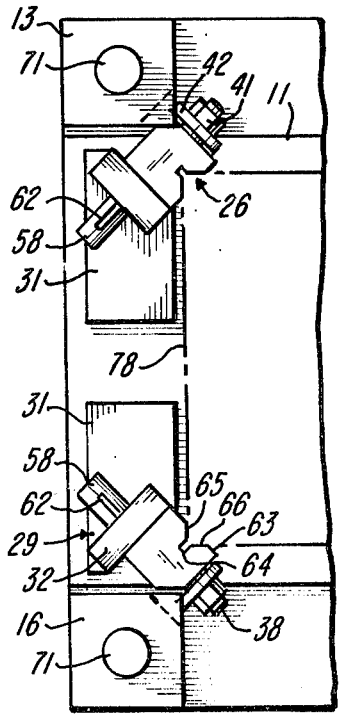
FIG. 2 is a top plan view of the braze fixture of FIG. 1, showing a portion only thereof.

Referring to the drawings, a braze fixture according to the illustrated embodiment of the invention includes a relatively heavy base member 10, square-like or rectangular in configuration. A mid portion of the base member 10 is relatively elevated and superposed thereon is a mounting plate 11. Plate 11 is precisely positioned on base member 10 and is appropriately fixed thereto, as by doweling. The assembly comprising members 10-11 forms a relatively heavy and stable base plate, plate 11 being appropriately machined to provide a flat upper surface 12. At the four corners of the base member 10, in an offset relation to mounting plate 11, are upstanding posts 13-16. As will hereinafter more clearly appear, the posts 13-16 serve a purpose in mounting a top plate assembly 17.

The plate 11 provides a floor or base upon which core parts of a plate type heat exchanger of like configuration are stacked for assembly prior to brazing. As indicated herein, such a heat exchanger core may comprise upper and lower core plates 18 and 19 between which are vertically spaced apart tube plates 21. The latter are alternated with corrugated fin strips 22 and 23 and with end and side marginal spacers 24 and 25. The parts may include overlays or coatings of a braze alloy or braze material, and, it will be understood that when the parts are stacked one upon another in the desired order there is defined the core of a heat exchanger in which passages in a transverse relation to one another flow fluids of different temperature for a transfer of heat through the plates 21. While the parts are so stacked, the assembly is subjected to a brazing operation which may include heating and cooling steps during which the braze alloy flows and forms a seal and a bond between adjacent, contacting parts. The many parts, which, in assembly, loosely superpose one upon another, are in this way united into an integrated structure.

Further included in the braze fixture are four parts locating assemblies 26–29 which, although substantially identical, may be regarded as comprised of oppositely orienting pairs for convenience of adjustment. Each assembly includes a base 31 appropriately secured to plate 11 adjacent a respective corner thereof. A vertically elongated support member 32 projects in upright fashion from base 31, being fixed at its lower end thereto, as by welding. One side of member 32 is formed as a relatively flat bearing surface 33. A locator member 34 is in a side by side relation to support member 32 and a surface 35 thereof is in a substantially flush sliding contact with surface 33. Intermediate their ends, the members 32 and 34 have aligning apertures 36 and 37 accommodating the transverse projection therethrough of a shaft 38. A pin 39, pressed in place through member 32, anchors one end of shaft 38. On the other end is a nut 41 and a washer 42, the arrangement being one to limit the members 32 and 34 in a relative separating motion while permitting relative motion therebetween in other senses. Aperture 36 in member 32 receives shaft 38 therein with a relatively close fit. However, aperture 37 in member 34 is both laterally elongated and angularly inclined. It accordingly accommodates an angular shifting motion of limited extent of member 34 relative to member 32 and to transverse shaft 38.

In surface 35, near opposite ends of member 34, are respective recesses 43 and 44. In the recess 43 is a short length link 45. An upper end of link 45 attaches to a pivot pin 46 received in a bore 47 in member 34. A lower end of the link attaches to a pivot pin 48 received in a bore 49 in member 32. In the recess 44 is a short length link 51 attaching at its opposite ends to pivot pins 52 and 53 received respectively in bore 54 in member 34 and in a bore 55 in base 31 unitarily formed with member 32. In effect, therefore, locator member 34 is carried by support member 32, through the medium of links 45 and 51, for bodily motion in a rotary sense. Such motion is limited, however, to a segment of arcuate movement, the limits of which are defined by aperture 37.

The members 32 and 34 have in their upper ends thereof aligning transverse apertures 56 and 57. A shaft 58 is accommodated therein and is anchored by means of a pin 59 to the locator member 34. Aperture 56 in member 32 is laterally elongated, and, in addition, is formed to have its top to bottom, or narrower dimension exceed the diameter of shaft 58. The shaft 58 accordingly is free to move bodily within aperture 56, including movement in an angular sense as before discussed. Shaft 58 projects through and beyond aperture 56 and in its projecting end has a slot 61. A wedge 62 is adapted to be inserted into slot 61, applying a dynamic pressure to the shaft at one end of slot 61 while applying reactant pressure to that side of the support member opposite bearing surface 33. It will be evident that, responsively to insertion of the wedge 62 into slot 61, member 34 is drawn into tight, frictional engagement with member 32, or more particularly with surface 33 thereof. Insertion of and withdrawal of wedge 62 is used, as will be seen, alternatively to lock the locator member to the support member and to release it for relative bodily shifting motion. Link 45 has a curved configuration, obviating interference engagement thereof with shaft 58 in the course of permitted relative motion of the locator member. The pivot pins 46 and 48 are in a laterally offset relation, as are pivot pins 52 and 53. In its mount to support member 32, therefore, locator member 34 is unbalanced and, in the absence of wedge 62, tends to fall forwardly therefrom, as from the position shown in FIG. 4 to the position shown in FIG. 7.

The locator assemblies 26–29 are oriented in such fashion that forwardly falling locator members move toward and substantially into a fixture area to be occupied by a stacked heat exchanger core. The assemblies are, moreover, positioned in diagonally opposed pairs, each having an inwardly or forwardly facing surface 63 intersecting and encroaching upon a respective corner of the core occupied area of the fixture. In each surface 63 is a perpendicular cut 64 and outer portions of the cut are expanded to form angular surfaces 65 and 66. Surfaces 65 and 66 position at angles approximately 45° to the plane of surface 63. Cut 64 and expanding surfaces 65 and 66 accordingly provide an angular indentation in surface 63 which is elongated in a sense vertically of the locator member to be continuous from end to end thereof.

The top plate assembly 17 includes separate, superposing plates 67, 68 and 69. Plate 67 has a configuration substantially like but greater than that of the core to be assembled and is adapted to rest either directly, or through a suitable pressure plate (not shown), upon the top core plate 18 of an assembled core. Upper core plate 18 may have laterally projecting angular portions to extend into an embracing relation to the plate 67. Plate 68 is substantially wider and longer than plate 67 and margins thereof are adapted to rest on upper ends of the posts 13–16. Projecting vertically upward from each post 13–16 is a stud 71 having a slot 72 therein. The plate 68 has openings through which studs 71 project. Wedges 73, installed in slots 72, react within the slots to apply downward pressure upon plate 68. The plate 69 corresponds approximately in configuration to plate 68 and substantially aligns therewith. It is provided with a series of downwardly projecting studs 74, each having a first diameter accommodated in apertures 75 in plate 68 and a second diameter accommodated in apertures 76 in plate 67. The arrangement provides a stud shoulder 77 engaging an upper surface of plate 67. In the event of downward motion of plate 67 being limited, a reactant pressure applied to studs 74 through shoulders 77 effectively lifts plate 69 from a seat on plate 68.

In use of the braze fixture, the top plate assembly 17 will initially be removed, and wedges 62 will be in place, holding the locator members 34 in a retracted position relatively to support members 32, substantially in a position as shown in FIG. 4. A false or "dummy" core is first installed in the braze fixture, assuming a position of rest on base plate 11. The false core, here indicated at 78, is a unitary, connected assembly of plates which in its external dimensions exactly matches the external dimensions of a core to be assembled. In placing the false core within the fixture it is allowed to rest on plate 11 in an angular rotary position of adjustment in which corners thereof assume a complementary relation to indented faces of the locator members 34, but substantially out of contact with the locator members by reason of the relatively retracted positions of the latter. At this point, the wedges 62 are withdrawn from slots in shaft 58, whereupon the several locator members 34 are allowed to fall forwardly and engage surfaces 65 and 66 with corner surfaces of the false core. When this has been done, and the locator members allowed to assume positions appropriate to the dimensions of a core to be assembled, the wedges 62 are reinserted, locking the locator members in their assumed positions. The false core is then lifted out of the braze fixture and the work of stacking the actual heat exchanger core commenced. In this operation, parts of the heat exchanger are put in place, one upon another and in a proper sequence within the area defined by the parts locators 34. In this connection, it will be understood that the indented, inwardly facing surfaces of the parts locators provide the angular surfaces 65 and 66 into which ends of the heat exchanger parts are inserted and which insure the building of a core to the precise dimensions contemplated. When stacking of the core has been completed and closed at the top by core plate 18, the top plate assembly 17 is installed. In this operation, plate 67 is put in a position of rest on top of the stacked core. Plate 67 is followed by plate 68 which is slipped over studs 71 and allowed to come to rest on plate 67. At this time, a stacked assembly of parts will have a height greater than its final or desired height by reason of an inherent or planned looseness of contact between superposing parts. Accordingly, as plate 68 is put in place it does not come to rest immediately on top of the posts 13-16 but rests instead on plate 67. Now, however, if wedges 73 are inserted in studs 71, plate 68 is forced downwardly to a seat on the posts 13-16, and, in the process, plate 67 applies endwise pressure to the assembly of heat exchanger parts. This pressure, together with reactant pressure applied at surface 12 of base plate 11, compresses the assembly of parts and assures close continuous contact between adjacent parts of a kind to be desired for effective brazing. The plate 69 is superimposed upon plates 68 and 67 and studs 74 thereof are allowed to enter respective apertures 75 and 76. Since, following installation of the wedges 73, the plate 63 is in contact with plate 67, the abutment of shoulders 77 with plate 67 projects plate 69 upward relatively to plate 68.

Upon withdrawal of the wedges 62, the parts locators 34 assume, under gravity influences, positions securing the heat exchanger core at its four corners. It will be understood, in this connection, that locators 34 are relatively heavy plate-like elements influenced by their support through links 45 and 51 to make a positive containment of the relatively light parts which make up the assembled core. With the parts so assembled, and the elements of the fixture adjusted as described, the fixture with its contained assembly of parts is subjected to brazing steps. It may, for example, be placed in a furnace wherein the temperature is raised to a value sufficiently high to cause the braze alloy or braze material, present as a coating, foil or the like between parts, to flow but not so high as to cause melting or softening of the material of which the parts themselves are made. Upon the furnace temperature being reduced from such high value, and the fixture removed from the furnace, the braze alloy will be found to have distributed itself between mating parts surfaces and to have penetrated minute cracks and crevices, and, in cooling and hardening, to have united the parts of the heat exchanger core into a one-piece unitary structure.

In the furnace, and during the time period in which the temperature is raised and in which may be held at an elevated value, the plates, spacers and fin material of which the heat exchanger core is comprised, respond to higher temperatures by expanding. According to the instant invention, this expansion is not prevented nor is it allowed to occur in an uncontrolled manner. Rather is the expansion directed and controlled so that it can take place without producing distortion in individual parts or in the assembly of parts. Thus, parts locators 34 engage corners of the core assembly in a manner to inhibit endwise and lateral displacement of spacer and plate parts. When, under the influence of rising temperature, these parts expand, the forces of expansion are controlled so that they can be applied only in a direction to displace locators 34 upwardly and outwardly or in a retracting sense relatively to support members 32. In so moving, the locators continue to engage corners of the core assembly and under gravity influence continue to maintain positions of containment relatively to the core structure. A cooling heat exchanger core continues to be held against warping or out of square distortion, as the locators 34 move again inwardly and downwardly in a following relation to the shrinking core structure. It is to be noted that because of the mounting of parts locators 34 they are maintained continuously in a perpendicular relation to base surface 12 throughout their relative extending and retracting movements. Precise parallelism of the indented surfaces of the locators from top to bottom of the heat exchanger core accordingly is assured.

Figure 3:
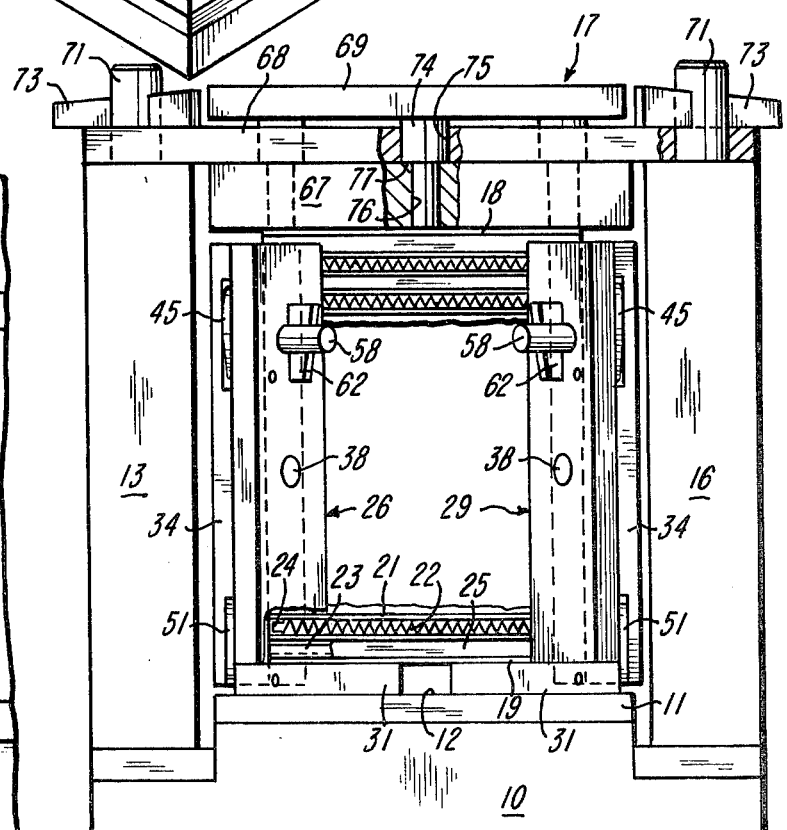
FIG. 3 is a view in side elevation of the braze fixture, shown with a heat exchanger core assembled therein and with parts in positions assumed prior to brazing.

During the brazing process, the heat exchanger core is prevented from appreciable expansion in a vertical sense by reason of the compression exerted by the top plate assembly 17. In the cooling step of the brazing process, a reduction in the top to bottom dimension tends to occur, in accompaniment with reductions in lateral dimensions. The latter occurs with no loss of containment by reason of the parts locators 34 being allowed to move inwardly and downwardly under the force of gravity. Vertical shrinkage is compensated for by the cooperative relationship provided for between the top plates 67 and 69. Thus, it has been noted that in the initial assembly of parts, plate 69 is projected slightly above plate 68 by reason of the engagement of the upper surface of plate 67 with stud shoulders 77. The weight of plate 69 accordingly is available to induce a following motion of plate 67 in the presence of a top to bottom height reduction of the heat exchanger core. The permitted movement may be on the order seen in a comparison of FIGS. 3 and 8. If desired, weights may be placed on plate 69 to assure a more positive compression of a cooling core.

The fixture has been disclosed as functioning in connection with a plate type heat exchanger core. It will be evident, however, that it may be used with any braze assembly in which multiple parts are liable to get out of line or otherwise be distorted as a consequence of the brazing operation. Modifications in the structure of the fixture, within the concepts of the invention, are, of course, possible. In this connection, reference may be made to FIG. 9 where a modified parts locator is illustrated adapted to extend the effective height of the locators for stacking purposes. In that illustrated instance, a parts locator 79 is provided which is identical to the parts locator 34 and which functions in the same manner insofar as its containment of stacked parts is concerned. In this illustrated instance, however, the locator has a pair of vertical bores 81 and 82 positioning to either side of a cut 83 in a face 84 of the locator. The bores 81 and 82 open through the top of the locator and at their peripheries are tangential to respective sloping surfaces 84 and 85 expanding from cut 83. Also formed in the locator 79 and communicating with bore 81 is a vertically orienting slot 86. A similar slot 87 is positioned on an opposite side of the locator and communicates with bore 85. In the bore 81 is a short length rod 88 provided with a laterally projecting stud 89. Similarly positioning in bore 82 is a rod 91 provided with a laterally projecting stud 92. The function and mode of operation of the rods 88 and 91 will be substantially self evident. When studs 89 and 92 are aligned with slots 86 and 87, the rods 88 and 91 are allowed to drop within respective bores and are in effect out of service. By lifting upon a stud 89 or 92, however, a corresponding rod 88 or 91 may be raised to project an upper end thereof above the top surface of the parts locator. Rotating the rod to misalign the studs 89 and 92 relative to the slots 86 and 87 effectively locks the rods in an upwardly projected position. The relationship of the rods to surfaces 84 and 85 is such as effectively to extend the height of these surfaces in an upwardly projected position of the rods.

I claim:

1. A fixture useful in positioning and holding parts stacked therein to form an assembled heat exchanger or the like and in holding said parts in an assembled relation during brazing, including:
(a) a base plate upon a defined area of which parts to form an assembly for brazing are stacked one upon another;
(b) a plurality of parts locating assemblies positioning on said base plate cooperating with one another peripherally to engage an assembly of stacked parts;
(c) each of said parts locating assemblies including a support member upstanding from said base plate and a relatively movable work engaging locator member in a substantially side by side relation to said support member;
(d) and means linking said locator member to said support member to control relative movement of said locator member.

2. A fixture according to claim 1,
(a) said linking means interconnecting said members in a relatively unbalanced relation;
(b) said locator member being urged by gravity forces to assume a position projected relatively to said support member;
(c) the parts locating assembly orienting on said base plate in a position to project said locator member toward said defined area of said base plate.

3. A fixture according to claim 2,
(a) said locator member having a relatively elongated work engaging edge;
(b) said linking means maintaining said work engaging edge substantially perpendicular to said base plate throughout relative movement of said locator member.

4. A fixture according to claim 1,
(a) said linking means including at least a single link pivotally attaching respectively to said support member and to said locator member at vertically spaced apart locations;
(b) said linking means connecting said locator member to said support member for relative extending and retracting movements;
(c) and said spaced apart locations being in a laterally offset relation to one another in both relatively extended and retracted positions of said locator member.

5. A fixture according to claim 4,
(a) said linking means including a pair of vertically spaced apart links;
(b) each link pivotally attaching at vertically spaced apart locations to said support member and said locator member.

6. A fixture according to claim 1,
(a) said linking means connecting said locator member to said support member for relative extending and retracting movements;
(b) and means for releasably fixing said locator member in selected positions of adjustment relative to said support member.

7. A fixture according to claim 6,
(a) including means holding said side by side support member and said locator member against relative separating motion;
(b) said holding means providing for the relative extending and retracting movements of said locator member to occur in an inclined plane.

8. A fixture according to claim 1,
(a) said base plate having pillar means upstanding therefrom;
(b) and means supported on said pillar means to cooperate with said base plate in applying a vertical compression to a stacked assembly of parts;
(c) said compression means including a top plate limited by said pillar means in an approaching motion toward said base plate.

9. A fixture according to claim 8, said compression means further including a plate superposing on said top plate and movable relatively thereto toward and from said base plate, and means utilizing relative motion of said superposing plate to apply a continuing compression to an assembly of stacked parts when the height of such assembly reduces to an extent rendering said top plate substantially ineffective to apply compression thereto.

* * * * *